United States Patent
Lee

(10) Patent No.: US 8,307,272 B2
(45) Date of Patent: Nov. 6, 2012

(54) NETWORK DEVICE AND METHOD OF CONTROLLING THE SAME

(75) Inventor: Jae-hoon Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 832 days.

(21) Appl. No.: 12/425,445

(22) Filed: Apr. 17, 2009

(65) Prior Publication Data
US 2010/0107043 A1      Apr. 29, 2010

(30) Foreign Application Priority Data

Oct. 24, 2008   (KR) .................. 10-2008-0104784

(51) Int. Cl.
G06F 11/00     (2006.01)
(52) U.S. Cl. ...................... 714/819; 714/821
(58) Field of Classification Search .................. 714/819, 714/821, 712, 824
See application file for complete search history.

(56) References Cited

U.S. PATENT DOCUMENTS

| 5,822,721 A * | 10/1998 | Johnson et al. ............... 704/219 |
| 7,010,582 B1 * | 3/2006 | Cheng et al. .................. 709/219 |
| 7,853,248 B2 * | 12/2010 | Harendra et al. ............. 455/418 |
| 2009/0327620 A1 * | 12/2009 | Arsovski et al. .............. 711/154 |

* cited by examiner

Primary Examiner — Dieu-Minh Le
(74) Attorney, Agent, or Firm — Drinker Biddle & Reath LLP

(57) ABSTRACT

A network device and a method for controlling the same. The device and method each performed the operations of transforming an input signal so as to allow the input signal to be divided according to frequency bands and resolutions, comparing the transformed input signal with abnormal signal information stored in an abnormal signal database (DB), and determining whether the input signal is a normal signal. When the input signal is a normal signal, the network and method each perform the operation of delivering the transformed input signal to a codec.

24 Claims, 9 Drawing Sheets

BEFORE TRANSFORMATION

AFTER TRANSFORMATION

NETWORK DEVICE AND METHOD OF CONTROLLING THE SAME

CROSS-REFERENCE TO RELATED PATENT APPLICATION

This application claims the benefit of Korean Patent Application No. 10-2008-0104784, filed on Oct. 24, 2008, in the Korean Intellectual Property Office, the entire content of which is incorporated herein by reference.

BACKGROUND OF THE INVENTION

1. Field of the Invention

The present invention relates to a network device, and a method of controlling the network device, that can collect video signals and can be accessed via a network.

2. Description of the Related Art

Due to developments in network technology, network devices providing various functions have become available. Conventional Internet Protocol (IP) network devices according to the related art typically only function to transmit their own multimedia data that is generated by receiving video data via an input unit. The conventional IP network devices unidirectionally transmit the generated multimedia data only to a client that requests data via a network. In this regard, there are no conventional IP network devices that can receive a data packet delivered via a network, and then re-edit, re-distribute, and re-process the data.

In general, the network devices transmit video data via a network. However, the video data may be damaged, the image quality of the video data may be degraded, discontinuities in the audio data may occur, and product quality may deteriorate according to network circumstances and the amount of data to be transmitted, due to the non-existence of a compressed streaming data transmitting method which is suitable for a network bandwidth that varies irregularly.

The conventional IP network devices perform a network operation by using one routing address to access a network. However, in the case where a designated router abnormally operates or malfunctions, the conventional IP network devices may not normally operate due to the non-existence of a technique by which the conventional IP network devices can detect the abnormal situation, and thus find another router or replace the malfunctioning router. Also, when a specific IP network device is over-loaded or over-accessed, there is no suitable solution so that a system-down occurs. In the case where the specific IP network device is a remote detecting device, the specific IP network device may not perform its own function as the remote detecting device due to a network problem such as a malfunctioning router.

Furthermore, when video data, which is input via an input unit of the conventional IP network devices, is abnormal due to external manipulation, there is no method for the conventional IP network devices to detect this abnormality.

SUMMARY OF THE INVENTION

The present invention provides an Internet Protocol (IP) network device and a method of controlling the IP network device that determines whether an input signal is normal or abnormal, and informs other network devices for the abnormality when the input signal is abnormal. The present invention also provides a network device and a method of controlling the network device that determines a bandwidth of a network, and determines a layer architecture with which a data stream is to be transmitted according to information about the bandwidth. The present invention further provides a network and a method of controlling the network device so that the network device, which has a small amount of data to be processed and transmitted, can replace another network device having a large amount of data to be processed and transmitted so as to perform data transmitting and processing functions instead of the other network device.

Accordingly, an embodiment of the present invention provides a network device controlling method including the operations of transforming an input signal so as to allow the input signal to be divided according to frequency bands and resolutions, comparing the transformed input signal with abnormal signal information stored in an abnormal signal database (DB), and determining whether the input signal is a normal signal. When the input signal is the normal signal, the method delivers the transformed input signal to a codec.

Another embodiment of the present invention provides a network device including an input signal transforming unit for transforming an input signal so as to allow the input signal to be divided according to frequency bands and resolutions, an abnormal signal DB for storing abnormal signal information, a normal signal determining unit for comparing the transformed input signal with the abnormal signal information stored in the abnormal signal DB, and determining whether the input signal is a normal signal, and a signal delivery unit for delivering the transformed input signal to a codec when the input signal is the normal signal. A further embodiment of the present invention provides a network device controlling method including the operations of determining, in response to receiving a request message from another network device, message content of the request message; and determining whether to receive a data signal according to the message content of the request message.

Still another embodiment of the present invention provides an apparatus comprising a receiving unit for receiving a request message from another network device, and receiving a data signal according to message content of the request message, a request message determining unit for determining the message content of the request message, and determining whether to allow the receiving unit to receive the data signal according to the message content of the request message, and a data signal delivery unit for delivering the data signal according to the message content of the request message. The apparatus further comprises a bandwidth determining unit for calculating an available bandwidth by using the data signal and the request message which are delivered by the data signal delivery unit, such that the request message comprises transmission time information and transmission path information from the other network device, a layer determining unit for determining the number of layers by using the available bandwidth, such that the number of layers is to be comprised in a unit of transmission when the other network device transmits the data signal, and a layer indicating unit for transmitting a message indicating the number of layers to the other network device. When the message content of the request message corresponds to a layer determination request message according to a network bandwidth, the request message determining unit controls the receiving unit to receive the data signal from the other network device, and the data signal delivery unit delivers the data signal to the bandwidth determining unit.

Still a further embodiment of the present invention provides an input signal transforming unit for transforming an input signal so as to allow the input signal to be divided according to frequency bands and resolutions, an abnormal signal DB for storing abnormal signal information; a normal signal determining unit for comparing the transformed input signal with the abnormal signal information stored in the abnormal signal DB, and determining whether the input signal is a normal signal, and a signal delivery unit for delivering the transformed input signal to a codec when the input signal is the normal signal; an abnormal signal processing unit for transmitting a message indicating that the input signal is not the normal signal to another network device when the input signal is not the normal signal. The input signal transforming unit further comprises a receiving unit for receiving a request message from the other network device, and receiving a data signal according to message content of the request message, a request message determining unit for determining the message content of the request message, and determining whether to allow the receiving unit to receive the data signal according to the message content of the request message, a data signal delivery unit for delivering the data signal according to the message content of the request message, and a bandwidth determining unit for calculating an available bandwidth by using the data signal and the request message which are delivered by the data signal delivery unit. In addition, the input signal transforming unit comprises a layer determining unit for determining the number of layers by using the available bandwidth, such that the number of layers is to be comprised in a unit of transmission when the other network device transmits the data signal, a layer indicating unit for transmitting a message indicating the number of layers to the other network device, a data signal storage unit storing the data signal received from the other network device, and a transmission control unit for transmitting the data signal received from the other network device to a target network device or a target client which is indicated by a request message, and storing the data signal in the data signal storage unit.

In this embodiment, the request message determining unit controls the receiving unit to receive the data signal from the other network device when the message content of the request message corresponds to a layer determination request message according to a network bandwidth, when the message content of the request message corresponds to an error message indicating that an input signal of the other network device is an abnormal signal, and when a message content of the request message corresponds to a transmission request message requesting to transmit the data signal of the other network device. The data signal delivery unit delivers the data signal to the bandwidth determining unit when the message content of the request message corresponds to the layer determination request message according to the network bandwidth, delivers the data signal to the normal signal determining unit when the message content of the request message corresponds to the error message indicating that the input signal of the other network device is an abnormal signal, and delivers the request message and the data signal, which is received from the other network device, to the transmission control unit when the message content of the request message corresponds to the transmission request message requesting to transmit the data signal of the other network device.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Exemplary embodiments of the present invention will now be described more fully with reference to the accompanying drawings, in which exemplary embodiments of the invention are shown. Parts that can be easily implemented by one of ordinary skill in the art may be omitted.

Figure 1:
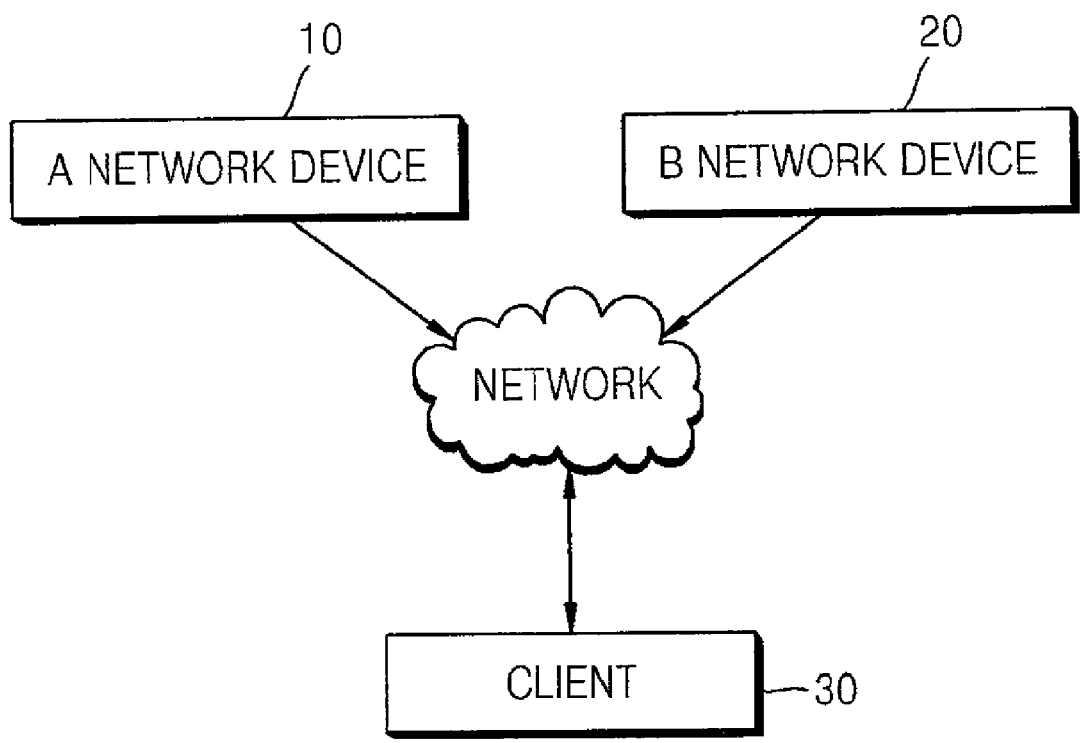
FIG. 1 is a diagram which illustrates an example of operations of network devices according to an embodiment of the present invention.

FIG. 1 is an example of a diagram illustrated to describe operations of network devices 10 and 20 according to an embodiment of the present invention. The network devices 10 and 20 (also referred to as A and B network devices 10 and 20) according to the embodiment of FIG. 1 may be interconnected via a network. A client 30 may access the A and B network devices 10 and 20 via the network, and thus may request data from them.

The network devices 10 and 20 receive at least one of video signals via an input unit, and thus generate a video data signal. The client 30 may request such video data signal and thus receive the video data signal via the network.

Each of the network devices 10 and 20 may receive the video signal so as to function as a surveillance device or a monitoring device. The surveillance device or the monitoring device may transmit data signals to the client 30, with the data signals being generated by photographing a situation at each location, and the client 30 may perform surveillance or monitor the situation at each location by using the data signals generated by photographic operations performed by the network devices 10 and 20.

However, the network devices 10 and 20 may receive abnormal input signals due to an internal defect, an external shock, or an external manipulation with respect to the network devices 10 and 20, and thus may transmit the abnormal input signals to the client 30. For example, when an video input signal of the A network device 10 is damaged due to a device malfunction such as thermal destruction, corrosion, or the like, the B network device 20 may receive an abnormal input signal from the A network device 10. Also, photographed areas of the network devices 10 and 20 may be manipulated by an intruder with a malicious intention, or video signals input to the network devices 10 and 20 may be falsified by the intruder.

The network devices 10 and 20 according to the embodiment of FIG. 1 determine whether input video signals are normal signals. For example, in the case where an input image includes an abnormal motion, the network devices 10 and 20 may determine the input video signals as abnormal signals. Also, with respect to the network devices 10 and 20 according to the embodiment of FIG. 1, when an input signal of the A network device 10 is an abnormal signal, an error message indicating that the input signal is the abnormal signal is transmitted to the B network device 20 and the client 30 so as to ensure that the B network device 20 and the client 30 do not request and receive data signals generated from the input signal of the A network device 10. In this manner, network resources may be prevented from being wasted due to continuous transmission of a meaningless signal.

Furthermore, when the B network device 20 according to the embodiment of FIG. 1 receives the error message from the A network device 10, the B network device 20 receives a data signal from the A network device 10, and thus re-determines whether the data signal from the A network device 10 is a normal signal. By doing so, reliability of the determination regarding the normality of the data signal may be improved.

Also, the network devices 10 and 20 may receive a request message and a data signal from another network device, and may determine an available bandwidth in a network and the number of layers with respect to transmission of the data signal in a current network situation. For example, when the B network device 20 may transmit a request message and a data signal to the A network device 10 so as to determine the number of layers, the A network device 10 may receive the request message and the data signal from the B network device 20, and may determine an available bandwidth in a network by using the request message and the data signal, and determine the number of layers for transmission of the data signal by using the available bandwidth. At this time, the A network device 10 transmits information about the available bandwidth and information about the number of layers to the B network device 20, and then the B network device 20 encodes the data signal according to the information about the number of layers and transmits the encoded data signal via the network. Also, the A network device 10 may encode a data signal according to the information about the number of layers determined by using the data signal received from the B network device 20, and thus may transmit the encoded data signal via the network.

Furthermore, with respect to the network devices 10 and 20, when the A network device 10 has a small amount of data to be processed and transmitted, while the B network device 20 has a large amount of data to be processed and transmitted, a data signal of the B network device 20 may be transmitted to the A network device 10 so that the A network device 10 may replace the B network device 20 and thus may perform input signal processing and/or data signal transmission with respect to the client 30, instead of the B network device 20. At this time, the A and B network devices 10 and 20 may recognize the mutual amount of data to be processed and transmitted via communication between the A network device 10 and the B network device 20. In particular, in the case where an input signal of the A network device 10 is determined as an abnormal signal, the A network device 10 has no need to process and transmit an input signal so that the A network device 10 may perform the input signal processing and/or the data signal transmission for the B network device 20.

Figure 2:
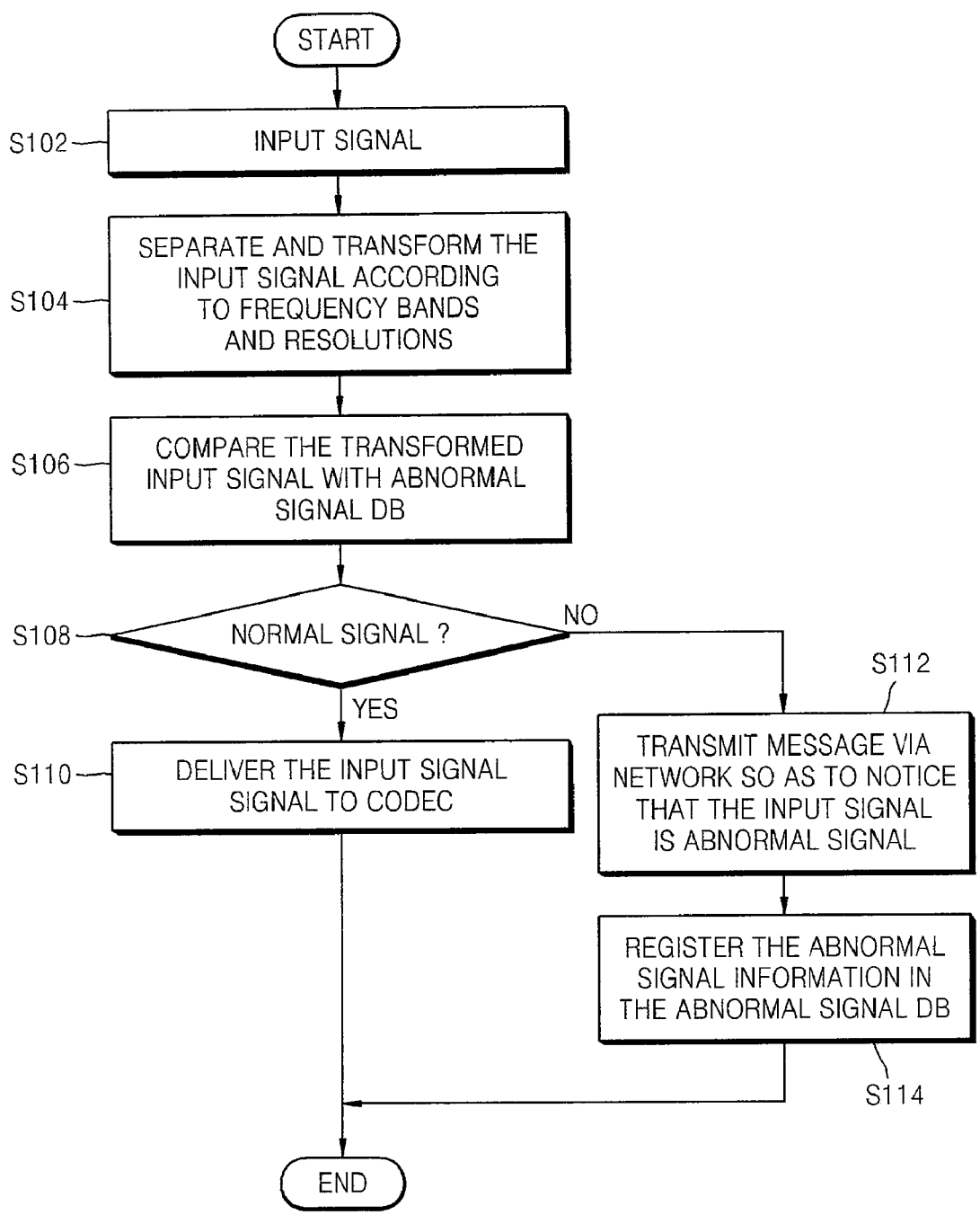
FIG. 2 is a flowchart of an example of a method of controlling a network device for determining whether an input signal is normal, according to an embodiment of the present invention.
Figure 3:
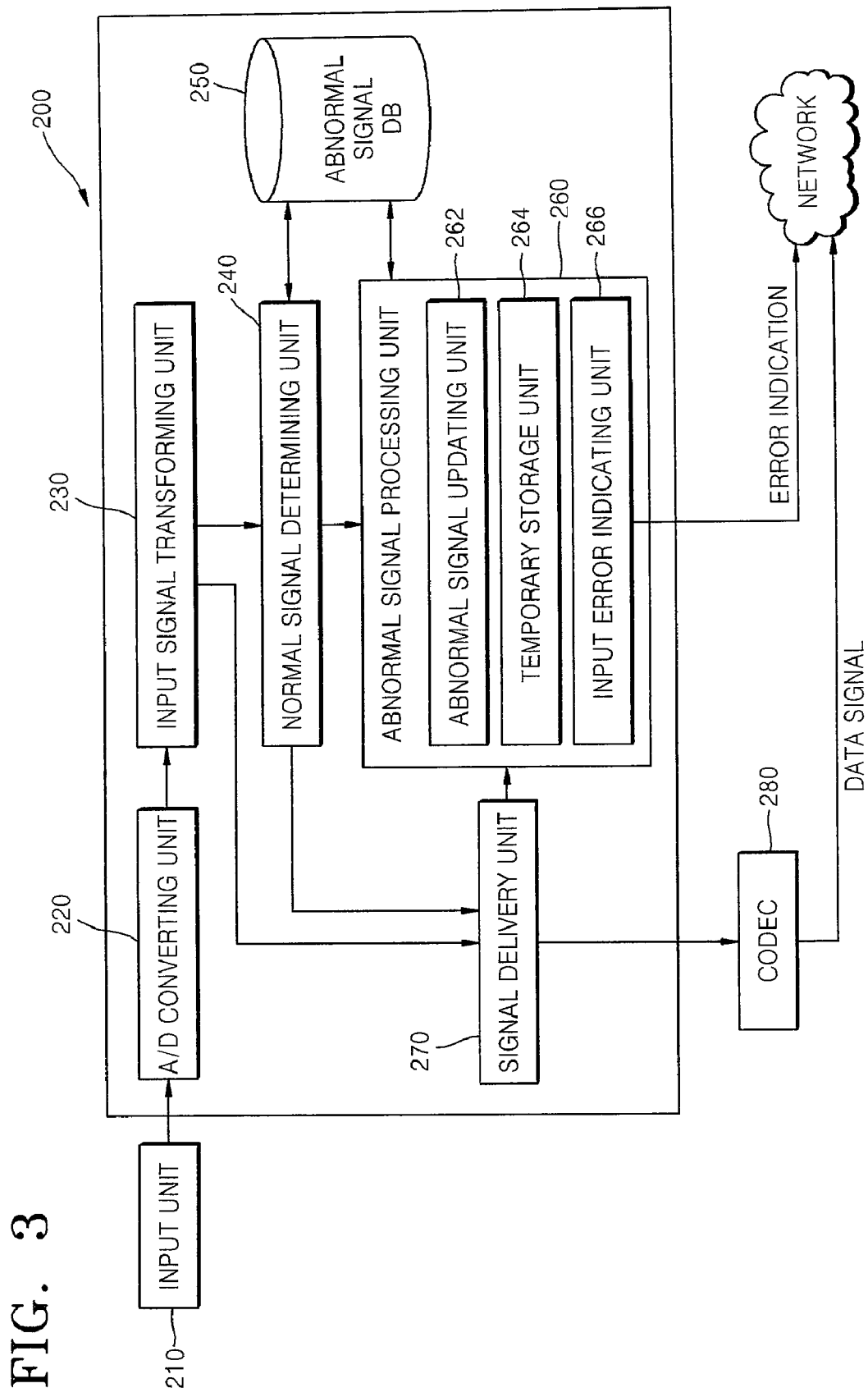
FIG. 3 illustrates an exemplary configuration of a network device for determining whether an input signal is normal according to another embodiment of the present invention.

FIG. 2 is a flowchart of an example of a method of controlling a network device for determining whether an input signal is normal, according to an embodiment of the present invention. FIG. 3 illustrates an example of a configuration of a network device for determining whether an input signal is normal according to another embodiment of the present invention.

The method of controlling the network device according to the embodiment of FIG. 2 (hereinafter, referred to as a "network device controlling method") includes receiving an input signal via an input unit 210 (refer to FIG. 3) in operation S102. At this time, the input signal may be at least one of video input signals.

Next, the input signal is transformed to be separated according to frequency bands and resolutions in operation S104. At this time, a wavelet transform may be used to transform the input signal.

Next, the transformed input signal is compared with an abnormal signal database (DB) 250 (refer to FIG. 3) in operation S106. The abnormal signal DB 250 contains a threshold value for variation values of motion information with respect to abnormal signal according to frequency bands, pattern information regarding frequency band components, a threshold value for difference values between frequency band component patterns, and/or threshold value information about a standard deviation of variation with respect to the motion information according to time. The motion information indicates the degree of an object's moving in the video input signal. The motion information may be obtained from the amplitude of motion vector.

The transformed input signal is compared with the abnormal signal DB 250, and as a result of the comparison, if the transformed input signal is not an abnormal signal, the input signal is determined as a normal signal in operation S108. The comparison between the transformed input signal and the abnormal signal DB 250 may be performed by using various methods. The wavelet transform, and a configuration to determine whether the input signal is the normal signal will be described below.

When the input signal is determined as the normal signal in operation S108, the transformed input signal is delivered to a codec in operation S110, and then the codec encodes the transformed input signal. When the input signal is determined as the abnormal signal in operation S108, the transformed input signal is not delivered to a codec, and a network device 200 (refer to FIG. 3) transmits an error message, which indicates that the input signal is the abnormal signal, to another network device and client via a network in operation S112. The other network device and client, having received such an error message, do not request the network device 200 for a data signal, and obtain information indicating that the network device 200 has a small amount of data to be processed and transmitted.

When the input signal is determined as the abnormal signal in operation S108, the network device 200 may transmit the transformed input signal as well as the error message to the other network device and client. By doing so, the other network device may re-determine whether the input signal of the network device 200 is an abnormal signal.

Also, information about the transformed input signal, which is determined as the abnormal signal, is stored in the abnormal signal DB 250 in operation S114. At this time, in order to reduce a load on the abnormal signal DB 250, the network device 200 according to the embodiment of FIG. 3 may separately include a temporary storage unit 264 (refer to FIG. 3) that temporarily stores abnormal signal information, may temporarily store the abnormal signal information in the temporary storage unit 264, and may periodically store the abnormal signal information in the abnormal signal DB 250, wherein the abnormal signal information is stored in the temporary storage unit 264.

Hereinafter, the network device 200 for determining whether an input signal is a normal signal will be described with reference to FIG. 3.

The network device 200 according to the embodiment of FIG. 3 includes an input signal transforming unit 230, a normal signal determining unit 240, an abnormal signal DB 250, an abnormal signal processing unit 260, and a signal delivery unit 270. The input signal transforming unit 230 transforms an input signal so as to allow the input signal to be separated according to a frequency band and resolution. At this time, a wavelet transform may be used to transform the input signal. The input signal is input via an input unit 210, and then is converted into an analog-to-digital converting unit 220. The input signal may be at least one of video input signals. The input unit 210 may be a photographing apparatus to receive the video input signals. The analog-to-digital converting unit 220 converts an analog input signal received via the input unit 210 to a digital signal.

The transformed input signal generated by the input signal transforming unit 230 is delivered to the signal delivery unit 270 and the normal signal determining unit 240. The normal signal determining unit 240 compares the transformed input signal with the abnormal signal DB 250, and thus determines whether the input signal is a normal signal. The comparison between the transformed input signal and the abnormal signal DB 250 may be performed by using various methods. The wavelet transform, and a configuration to determine whether the input signal is the normal signal will be described below.

A signal, which indicates the determination performed by the normal signal determining unit 240, is delivered to the signal delivery unit 270 and the abnormal signal processing unit 260. When the input signal is determined as the normal signal, the signal delivery unit 270 delivers the transformed input signal to a codec 280. The codec 280 receives the transformed input signal, compresses the input signal, and transmits the compressed input signal to another network device or client via a network.

When the input signal is determined as an abnormal signal, the signal delivery unit 270 delivers the transformed input signal to the abnormal signal processing unit 260. The abnormal signal processing unit 260 may include an abnormal signal updating unit 262, a temporary storage unit 264, and an input error indicating unit 266.

When the abnormal signal processing unit 260 receives a signal, which indicates that the input signal is the abnormal signal, from the normal signal determining unit 240, the abnormal signal processing unit 260 stores the transformed input signal delivered from the signal delivery unit 270 in the temporary storage unit 264. The abnormal signal updating unit 262 periodically stores the transformed input signal stored in the temporary storage unit 264 in the abnormal signal DB 250.

Also, when the abnormal signal processing unit 260 receives the signal, which indicates that the input signal is the abnormal signal, from the normal signal determining unit 240, the input error indicating unit 266 generates an error message indicating that the input signal is the abnormal signal, and transmits the error message to other network device and client via the network. The input error indicating unit 266 transmits the transformed input signal as well as the error message to the other network device and client. By doing so, the other network device may re-determine whether the input signal of the network device 200 is the abnormal signal.

Figure 4A:
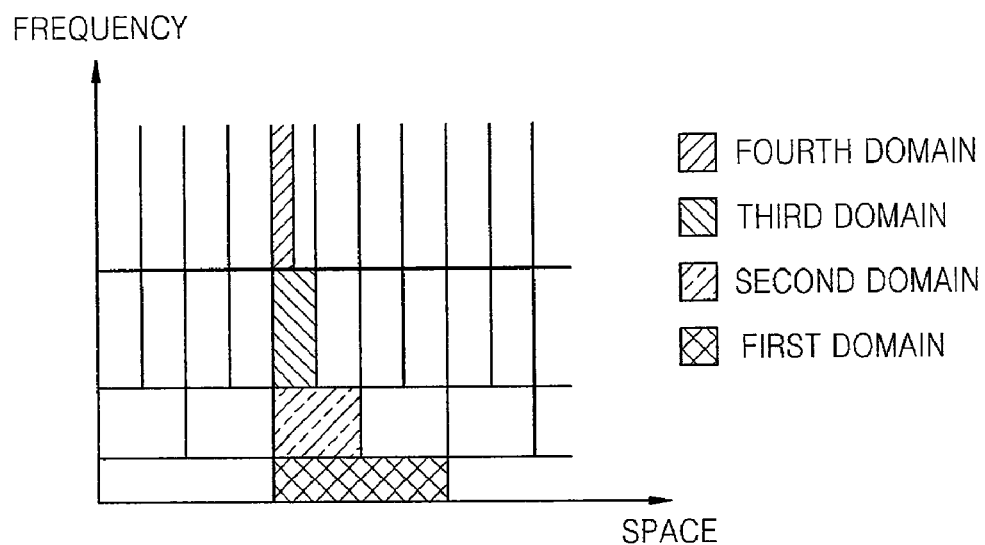
FIGS. 4A and 4B are diagrams for describing examples of a wavelet transform.
Figure 4B:
Figure 4B:
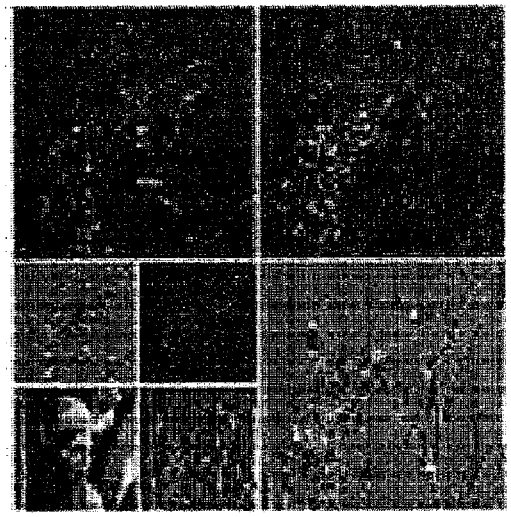

FIGS. 4A and 4B are diagrams for describing examples of a wavelet transform.

The wavelet transform is used to divide an input signal according to a frequency band and resolution by scaling and shifting the input signal.

A basis function $\Psi_{j,k}(t)$ of the wavelet transform is calculated by using Equation 1.

$$\Psi_{j,k}(t)=2^{j/2}\Psi(2^j t-k) \qquad \text{[Equation 1]}$$

An input signal f(t) may be calculated by using Equation 2 using the basis function $\Psi_{j,k}(t)$.

$$f(t) = \sum_{j,k} a_{j,k} \Psi_{j,k}(t) \qquad \text{[Equation 2]}$$

Multiresolution analysis (MRA) based on wavelets use a scaling function and a wavelet function. Here, the input signal f(t) may be calculated by using Equation 3.

$$\begin{aligned} f(t) &= \sum_{j,k} c_j(k)\Phi_{j,k}(t) + \sum_{j,k} d_j(k)\Psi_{j,k}(t) \\ &= \sum_{j,k} c_j(k)2^{j/2}\Phi(2^j t - k) + \\ &\quad \sum_{j,k} d_j(k)2^{j/2}\Psi(2^j t - k) \end{aligned} \qquad \text{[Equation 3]}$$

As a result of the wavelet transform, the input signal is separated according to a frequency band and a spatial domain as illustrated in FIG. 4A. Also, by separating the input signal according to the frequency band and resolution, the input signal may be transformed to be like a reference example after transformation as illustrated in FIG. 4B.

According to an embodiment for determining whether an input signal is a normal signal, the network device 200 compares a variation value of frequency band components of the input signal, according to variation of frames, with a threshold value stored in the abnormal signal DB 250, and determines the input signal as an abnormal signal when the variation value is greater than the threshold value. Since the input signal varies according to time, the network device 200 performs wavelet transformation on the input signal with respect to each frame, and obtains the variation value of the frequency band components of the input signal according to the variation of the frames. Next, the network device 200 compares the variation value with the threshold value stored in the abnormal signal DB 250. When an abnormal signal is input to the network device 200, for example, when a noise signal occupies most of the input signal due to a malfunction of the input unit 210 of the network device 200, when images captured by the network device 200 are intentionally changed by an external intruder, or when the input unit 210 of the network device 200 is blocked by an insect or the like, a value of the input signal is abnormally and sharply changed. Accordingly, a variation value of each frequency band component is abnormally and sharply changed, and in this case, the network device 200 may determine the input signal as an abnormal signal when the variation value of each frequency band component is greater than the threshold value. Also, the variation value of each frequency band component may be determined according to the resolution.

In another embodiment of the present invention, the network device 200 may compare a pattern of each frequency band component with an abnormal signal pattern stored in abnormal signal information, and may determine the input signal as an abnormal signal when a difference value between the pattern and the abnormal signal pattern is less than a threshold value stored in the abnormal signal information. The abnormal signal DB 250 contains a plurality of abnormal signal patterns. These abnormal signal patterns may be stored in the abnormal signal DB 250 according to every frequency band and/or every resolution. The abnormal signal patterns contain patterns according to every frequency band and/or every resolution, wherein the abnormal signal may have such patterns. The abnormal signal patterns may be accumulated in the abnormal signal processing unit 260 and the abnormal signal DB 250 since the network device 200 is continuously used. When the transformed input signal is compared with the abnormal signal pattern stored in the abnormal signal DB 250, if a difference therebetween is great, the input signal may be regarded as the normal signal. When the transformed input signal is compared with the abnormal signal pattern, if the transformed input signal is similar to the abnormal signal pattern and the difference therebetween is less than the threshold value, the input signal may be regarded as the abnormal signal. The comparison between the transformed input signal and the abnormal signal pattern may be performed by using various schemes such as a difference signal method, convolution, etc.

In a further embodiment of the present invention, the network device 200 may extract motion information according to the variation of frames of the input signal, may compare a standard deviation of the variation with respect to the motion information according to time with a threshold value stored in the abnormal signal information, and may determine the input signal as an abnormal signal when the standard deviation is greater than the threshold value. That is, the network device 200 obtains motion vectors according to the variation of the frames, and obtains a standard deviation between the motion vectors. At this time, when there is an abnormally sudden variation in the input signal, the input signal may be regarded as the abnormal signal. Thus, when the standard deviation between the motion vectors is greater than the threshold value, the input signal is determined as the abnormal signal.

In still another embodiment of the present invention, the network device 200 may determine whether the input signal is a normal signal by considering all result values obtained by the first, second, and third embodiments. For example, the network device 200 may linearly combine the result values obtained by the first, second, and third embodiments, may compare the result values with a threshold value, and thus may determine whether the input signal is a normal signal.

FIGS. 5A through 5D are flowcharts of an example of a method of controlling a network device for receiving a request message and a data signal from another network device, according to another embodiment of the present invention.

When a request message is received, the method of controlling the network device according to the embodiment of FIGS. 5A through 5D (hereinafter, referred to as a 'network device controlling method') includes determining message content of the request message in operation S310. The request message may be one of an error message indicating that an input signal of another network device is an abnormal signal; a layer determination request message requesting determination of an available bandwidth and the number of layers for transmission of a data signal which are of the other network device; and a transmission request message requesting a data signal of the other network device to be transmitted to a client or to another network device. The network device controlling method may include receiving the data signal transmitted from the other network device only when one of the aforementioned three request messages is received, or the network device controlling method may not include receiving the data signal. In this manner, the network device constantly or almost constantly receives a small-sized request message or small-sized control signals, and limitedly receives a data signal only when a predetermined request message or a predetermined control signal is received by the network device. By doing so, according to the embodiments of the present invention, it is possible to prevent network resources being wasted, and to allow one or more network devices to receive a data signal only when one or more network devices need the data signal.

When the request message is received, the network device controlling method includes determining whether the request message is the error message in operation S320, the layer determination request message in operation S340, or the transmission request message in operation S360. In the case where the request message is determined to be the error message in operation S320, the network device controlling method includes receiving a data signal in operation S322 (see FIG. 5B). The data signal, which is received as well as the error message, may be an input signal that is not compressed by a codec but is separated according to frequencies and resolutions by using a wavelet transform and then is transformed.

When the data signal is received, the data signal is compared with abnormal signal information stored in an abnormal signal DB, and thus it is determined whether the data signal is an abnormal signal in operation S324.

When the data signal is determined to be the abnormal signal in operation S326, the network device controlling method includes transmitting an error message to the other network device which has transmitted the data signal, wherein the error message indicates that the data signal is the abnormal signal in operation S328. Also, the error message may be transmitted to another network device and a client, as well as the other network device which has transmitted the data signal. Furthermore, the network device controlling method may include registering the data signal in the abnormal signal DB.

When the data signal is not the abnormal signal as determined in operation S326, the network device controlling method includes transmitting a message to the other network device which has transmitted the data signal, wherein the message indicates that the data signal is not the abnormal signal in operation S330. Also, the message may be transmitted to another network device and client, as well as to the other network device which has transmitted the data signal.

In the case where the request message is the layer determination request message as determined in operation S340, the network device controlling method includes receiving a data signal in operation S342 (see FIG. 5C) and determining an available bandwidth by using the data signal and the layer determination request message in operation S344. At this time, the layer determination request message may include transmission time information, transmission path information, and the number of layers, which are related to the data signal. By using such information included in the layer determination request message and the data signal, the network device controlling method may include calculating the available bandwidth.

Next, by using the calculated available bandwidth, the network device controlling method includes determining the number of layers to be used by the other network device which has transmitted the layer determination request message when the other network device transmits the data signal in operation S346. That is, when the data signal is transmitted, if the available bandwidth is large, the other network device which has transmitted the layer determination request message may use a large number of layers, and if the available bandwidth is small, the other network device which has transmitted the layer determination request message may use a small number of layers.

When the number of layers is determined, the network device controlling method includes transmitting a message to the other network device which has transmitted the layer determination request message, wherein the message indicates the determined number of layers in operation S348. In the case where the other network device, which has received the message, transmits a data signal, the other network device compresses an input signal according to the determined number of layers indicated by the message, and thus transmits the input signal. Also, a network device, which receives the layer determination request message, determines the number of layers and provides the number of layers to the other network device, may compress an input signal by using the determined number of layers and may transmit the input signal.

Figure 5A:
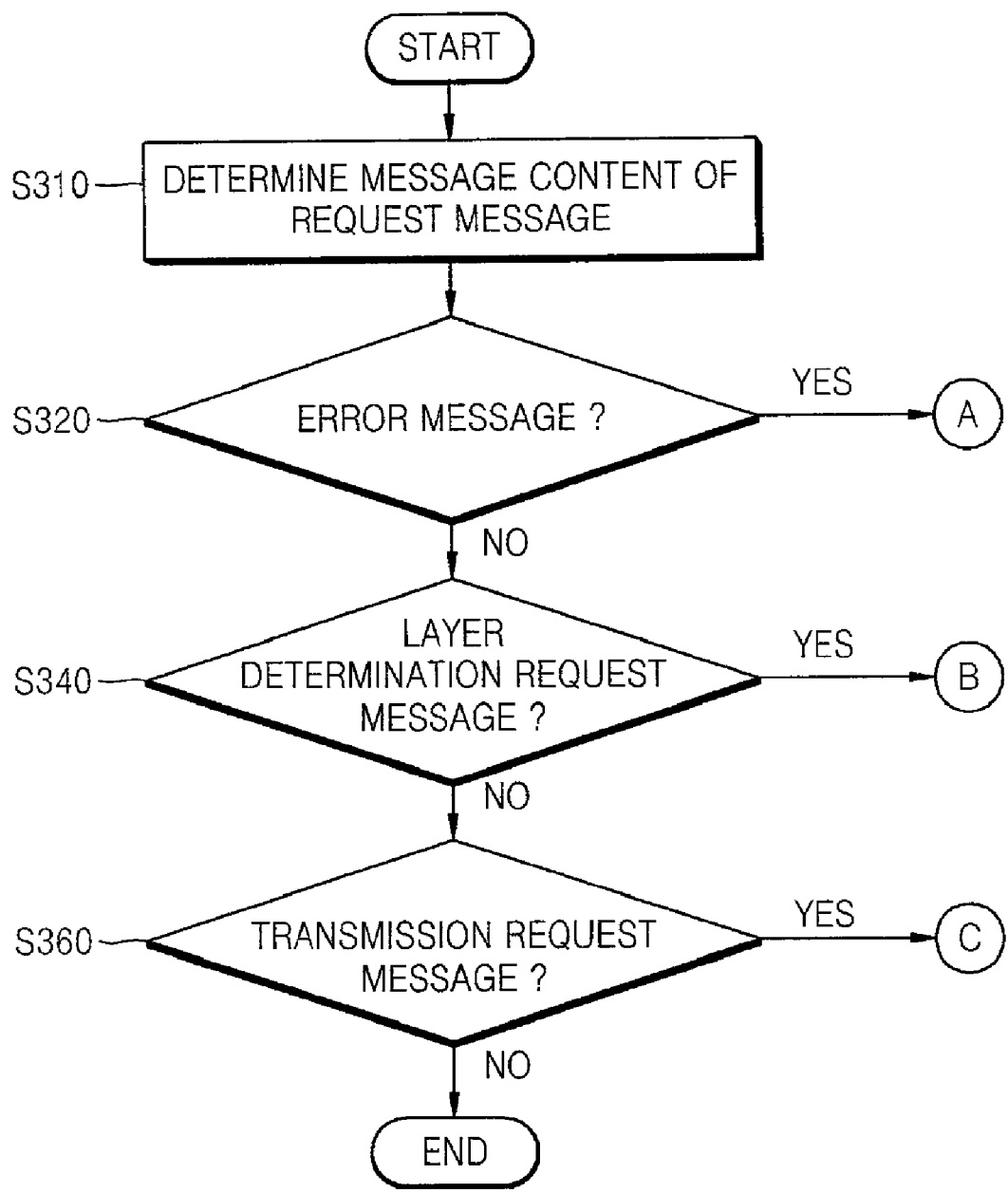
FIGS. 5A through 5D are flowcharts of an example of a method of controlling a network device for receiving a request message and a data signal from another network device, according to another embodiment of the present invention.
Figure 5B:
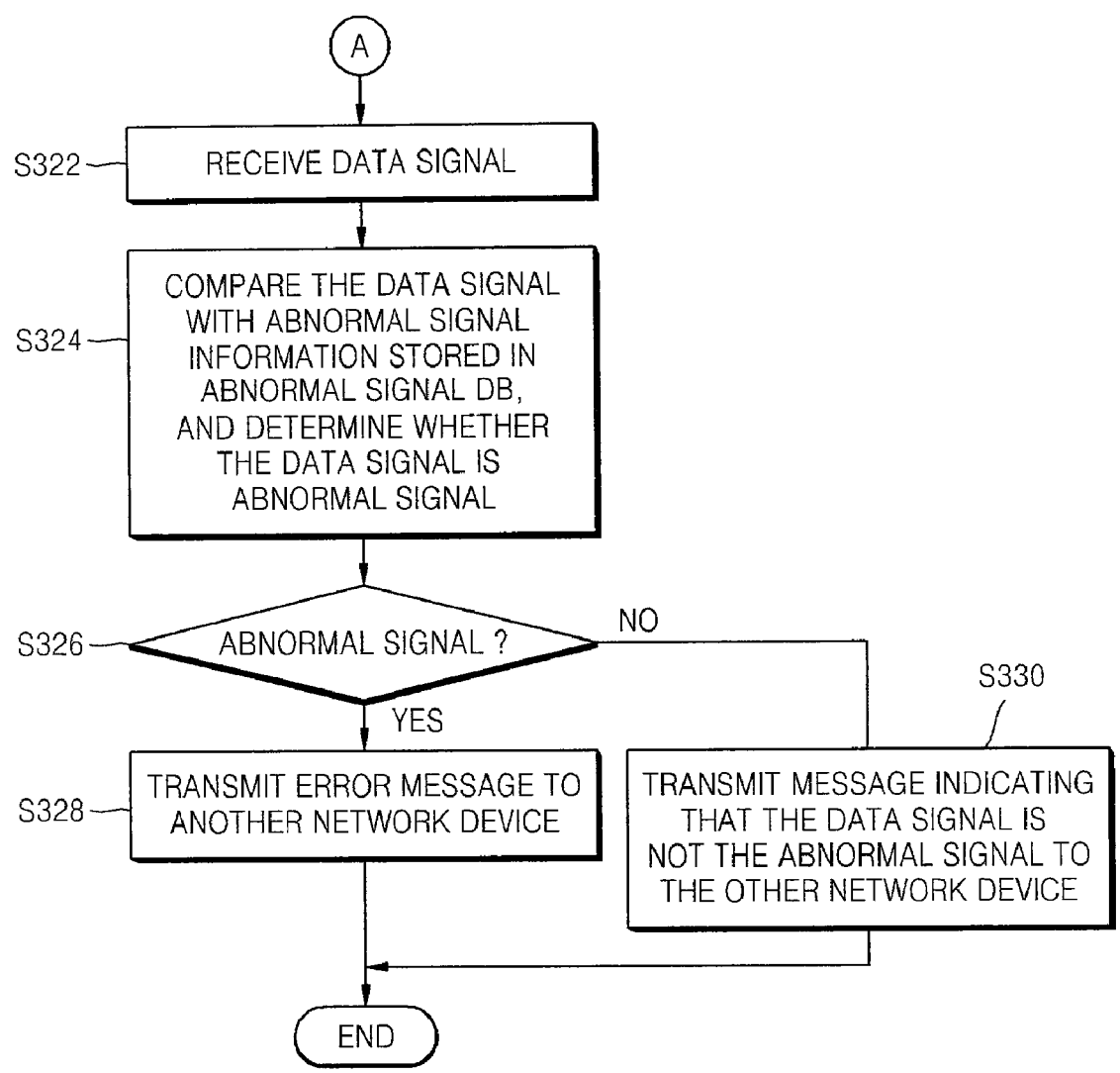
Figure 5C:
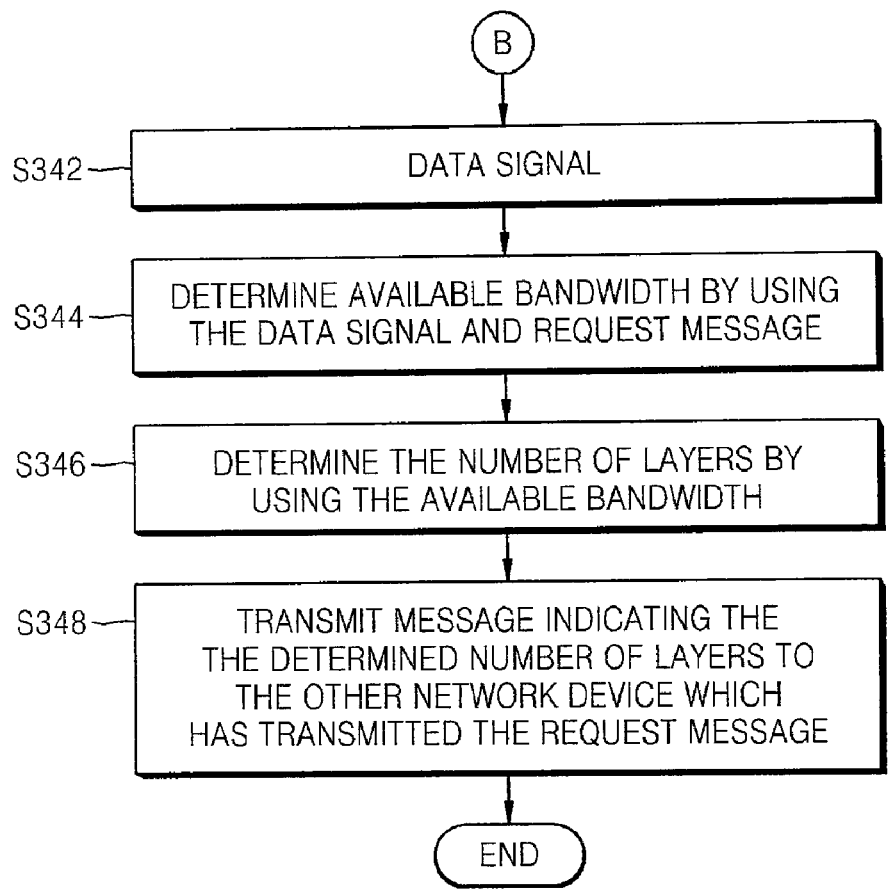
Figure 5D:
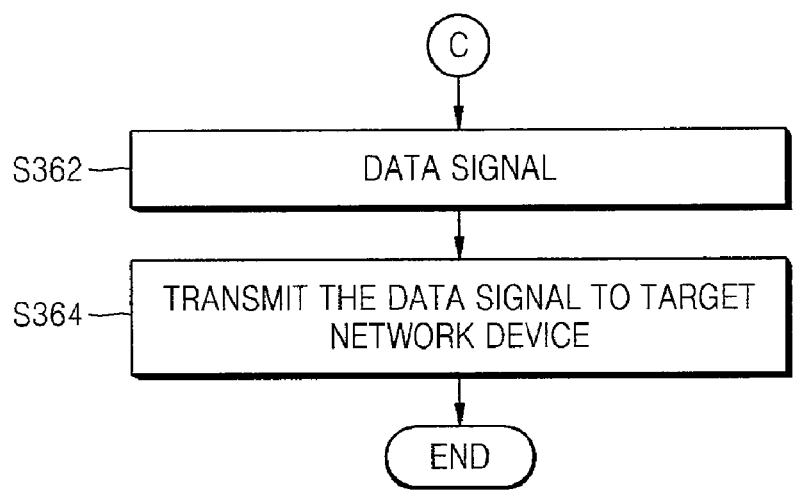

In the case where the request message is the transmission request message as determined in operation S360, the network device controlling method includes receiving a data signal from a network device A which has transmitted the transmission request message in operation S362 (see FIG. 5D). After the data signal is received, instead of the network device A which has transmitted the transmission request message, a network device B having received the transmission request message may transmit a data signal to a client that requests the network device A for the data signal in operation S364. In this manner, the network device B having a small amount of data to be processed replaces the network device A having a large number of data to be processed, for a data signal transmission operation of the network device A, and thus, a load on the network device A having the large number of data to be processed may be reduced.

Figure 6:
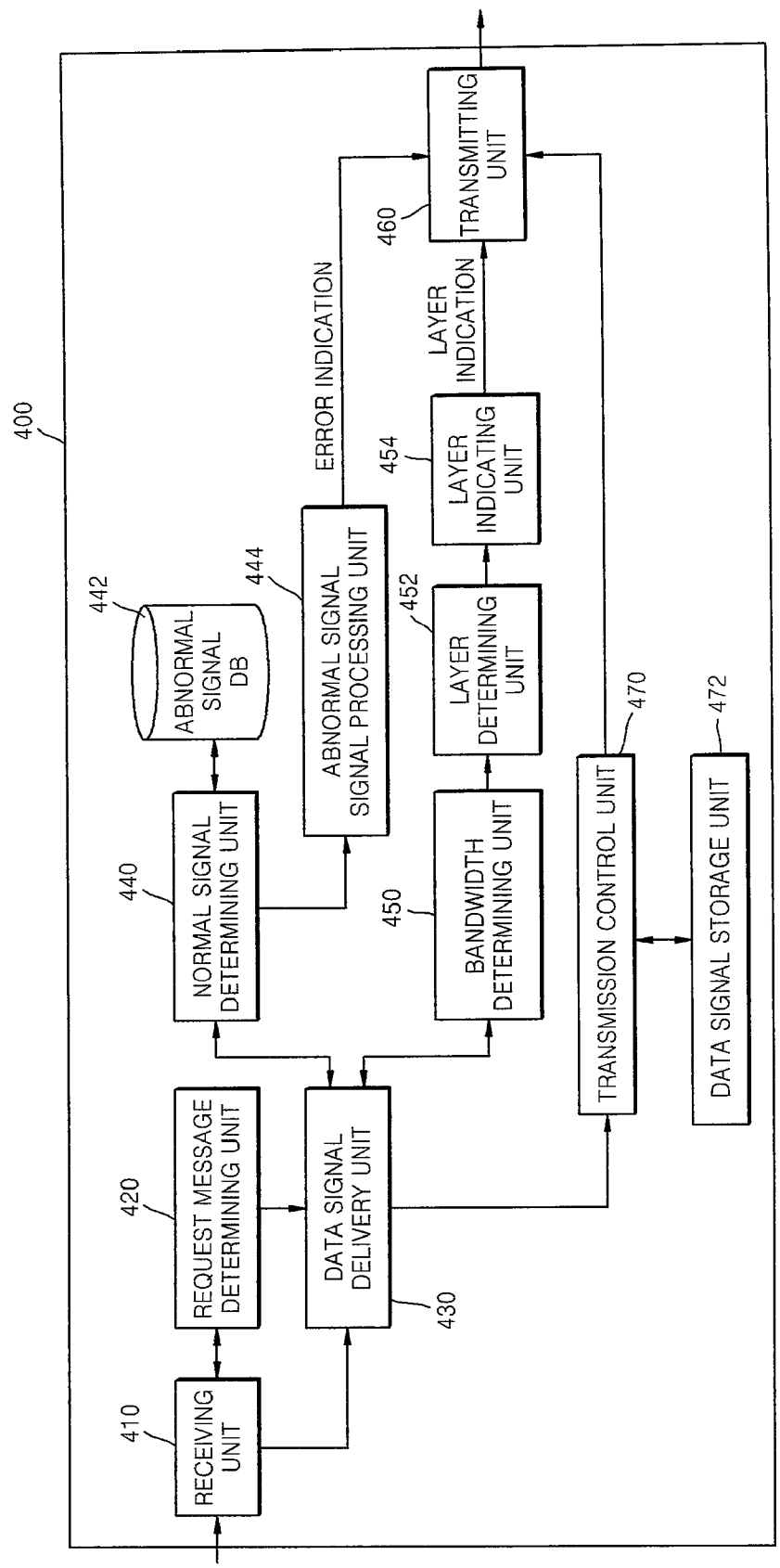
FIG. 6 is a block diagram of an example of a network device that receives a request message and a data signal from another network device according to another embodiment of the present invention.

FIG. 6 is an example of a block diagram of a network device 400 that receives a request message and a data signal from another network device according to another embodiment of the present invention. The network device 400 according to the embodiment of FIG. 6 includes a receiving unit 410, a request message determining unit 420, a data signal delivery unit 430, a normal signal determining unit 440, an abnormal signal DB 442, an abnormal signal processing unit 444, a bandwidth determining unit 450, a layer determining unit 452, a layer indicating unit 454, a transmitting unit 460, a transmission control unit 470, and a data signal storage unit 472.

The receiving unit 410 receives a request message and a data signal received via a network. At this time, the receiving unit 410 receives the data signal only when the request message determining unit 420 determines that the data signal is to be received. The request message determining unit 420 determines message content of the request message that is received by the receiving unit 410.

The request message according to the embodiment of FIG. 6 may be one of an error message indicating that an input signal of another network device is an abnormal signal, a layer determination request message requesting determination of an available bandwidth and the number of layers for transmission of a data signal, which are of the other network device, and a transmission request message requesting a data signal of the other network device to be transmitted to a client or to another network device. The receiving unit 410 of the network device according to the embodiment of FIG. 6 may receive a data signal transmitted from the other network device only when one of the aforementioned three request messages is received, or the receiving unit 410 may not receive the data signal. Thus, the network device 400 according to the embodiment of FIG. 6 constantly or almost constantly receives a small-sized request message or small-sized control signals, and limitedly receives a data signal only when the network device 400 receives a predetermined request message or a predetermined control signal. By doing so, according to the embodiments of the present invention, it is possible to prevent network resources being wasted, and to allow one or more network devices to receive a data signal only when one or more network devices need the data signal.

The request message determining unit 420 determines the message content of the request message, and thus controls the receiving unit 410 to receive the data signal when the request message is one of the error message, the layer determination request message, or the transmission request message. Also, according to the message content of the request message, the request message determining unit 420 controls the data signal delivery unit 430 to deliver the data signal to a corresponding element.

That is, in the case where the request message is the error message, the data signal delivery unit 430 transmits the data signal to the normal signal determining unit 440, when the request message is the layer determination request message, the data signal delivery unit 430 transmits the data signal and the layer determination request message to the bandwidth determining unit 450, and when the request message is the transmission request message, the data signal delivery unit 430 transmits the data signal and the transmission request message to the transmission control unit 470. The normal signal determining unit 440 compares the data signal with abnormal signal information stored in the abnormal signal DB 442, and thus determines whether the data signal is a normal signal. Descriptions about the determination of normality of the data signal and about the abnormal signal information stored in the abnormal signal DB 442 are the same as those which are previously described with reference to FIGS. 2, 3, 4A and 4B.

When the normal signal determining unit 440 determines the data signal as an abnormal signal, the abnormal signal processing unit 444 transmits a message, which indicates that the data signal is the abnormal signal, to the other network device via the transmitting unit 460, wherein the other network device has transmitted the data signal. Also, the abnormal signal processing unit 444 may transmit the message, which indicates that the data signal is the abnormal signal, to another network device and a client, as well as the other network device which has transmitted the data signal. Furthermore, when the data signal is determined as the normal signal, the abnormal signal processing unit 444 may transmit a message, which indicates that the data signal is the normal signal, to the other network device which has transmitted the data signal.

In the case where the request message is the layer determination request message, the data signal delivery unit 430 transmits the data signal and the layer determination request message to the bandwidth determining unit 450. The bandwidth determining unit 450 calculates an available bandwidth by using information included in the layer determination request message and in the data signal. At this time, the layer determination request message may include transmission time information, transmission path information, and the number of layers, which are related to the data signal. Also, the data signal may include the information such as the number of layers. By using such information included in the layer determination request message and the data signal, the network device 400 according to the present invention may calculate the available bandwidth. The layer determining unit 452 determines the number of layers to be used by the other network device which has transmitted the layer determination request message when the other network device transmits the data signal. The layer indicating unit 454 transmits a message to the other network device which has transmitted the layer determination request message via the transmitting unit 460, wherein the message indicates the number of layers determined by the layer determining unit 452.

When the other network device, which has received the message, transmits the data signal, the other network device compresses an input signal according to the number of layers indicated by the message, and thus transmits the input signal. Also, the network device 400 receiving the layer determination request message and determining the number of layers may compress an input signal by using the determined number of layers and may transmit the input signal.

In the case where the request message is the transmission request message, the transmission request message and the data signal are delivered to the transmission control unit 470. The transmission control unit 470 stores the data signal in the data signal storage unit 472, and transmits the data signal to a target network device or a target client via the transmitting unit 460, wherein the target network device or the target client is indicated by the transmission request message.

After the data signal is received, instead of the other network device (also, referred to as 'the network device A') which has transmitted the transmission request message, the network device 400 (also, referred to as 'the network device B') having received the transmission request message may transmit a data signal to a client that requests the network device A for the data signal. In this manner, the network device B having a small amount of data to be processed replaces the network device A having a large number of data to be processed, for a data signal transmission operation of the network device A, and thus, a load on the network device A having the large number of data to be processed may be reduced.

Figure 7:
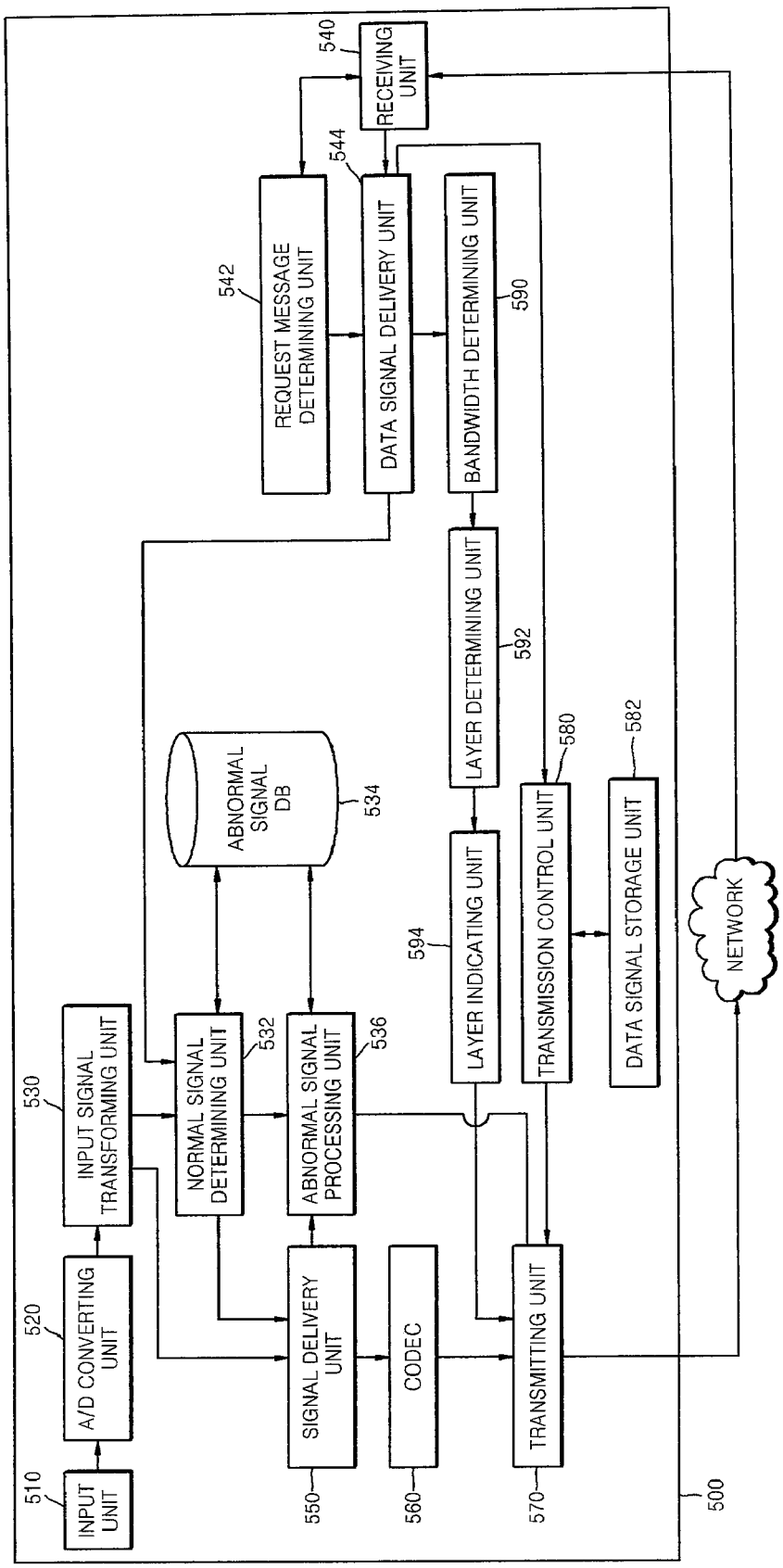
FIG. 7 is a block diagram of an example of a network device according to another embodiment of the present invention.

FIG. 7 is a block diagram of an example of a network device 500 according to another embodiment of the present invention. In order to perform all functions of the network devices according to the embodiments of FIGS. 3 and 6, the network device 500 according to the embodiment of FIG. 7 may have a configuration as described below. That is, in order to function by determining whether an input signal is a normal signal, the network device 500 may include an input unit 510, an analog-to-digital converting unit 520, an input signal transforming unit 530, a normal signal determining unit 532, an abnormal signal DB 534, an abnormal signal processing unit 536, a signal delivery unit 550, a codec 560, and a transmitting unit 570. Also, in order to receive a request message from another network device, to receive a data signal according to message content of the request message, and to process the data signal, the network device 500 may include a receiving unit 540, a request message determining unit 542, a data signal delivery unit 544, a bandwidth determining unit 590, a layer determining unit 592, a layer indicating unit 594, a transmission control unit 580, and a data signal storage unit 582.

The network device 500 having the aforementioned configuration may determine whether an input signal is a normal signal, and may replace a B network device having a large amount of data to process so as to perform an operation of the B network device in the case where an A network device has a small amount of data to process since an input signal of the A network device is determined as an abnormal signal. Also, the network device 500 may allow the B network device to perform re-determination with respect to a signal of the A network device being a normal signal, and thus may improve reliability of the determination with respect to the normal signal. Furthermore, according to the embodiments of the present invention, an available bandwidth may be determined, and the number of layers regarding a data signal to be transmitted may be determined via communication between each of the network devices 500. By doing so, it is possible to transmit the data signal based on an adaptive layer architecture that is suitable for a network situation.

As can be appreciated from the above, the network device and the network device controlling method according to the embodiments of the present invention determine whether an input signal is a normal signal, so that it is possible to prevent network resources being wasted by transmitting (e.g., continuously transmitting) an abnormal signal. Also, determination, which is performed by an A network device and which is with respect to the normality of the input signal, is re-determined by a B network device so that reliability of the determination with respect to the normality of the input signal may be improved.

Furthermore, the network device and the network device controlling method according to the embodiments of the present invention determine a layer, via which a data signal is to be transmitted, according to a network bandwidth so that the data signal may be efficiently transmitted in a manner suitable for a network situation. Also, with respect to the embodiments of the present invention, a network device having a small amount of data to process can replace a network device having a large amount of data to process so as to perform an operation of the network device having the large amount of data to process. By doing so, a load on the network device having the large amount of data to process can be reduced.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A network device controlling method, comprising:
    transforming an input signal so as to allow the input signal to be divided according to frequency bands and resolutions;
    comparing the transformed input signal with abnormal signal information stored in an abnormal signal DB (database), and determining whether the input signal is a normal signal; and
    when the input signal is the normal signal, delivering the transformed input signal to a codec.

2. The network device controlling method of claim 1, further comprising, when the input signal is not the normal signal, storing the transformed input signal in the abnormal signal DB.

3. The network device controlling method of claim 2, wherein the storing of the transformed input signal comprises:
    storing the transformed input signal in a temporary storage unit; and
    periodically storing data in the abnormal signal DB, wherein the data is stored in the temporary storage unit.

4. The network device controlling method of claim 1, when the input signal is not the normal signal, further comprising transmitting a message indicating that the input signal is not the normal signal to another network device.

5. The network device controlling method of claim 1, wherein the transforming comprises using a wavelet transform to transform the input signal.

6. The network device controlling method of claim 1, wherein the determining comprises comparing a variation value, which is of frequency band components of the input signal according to variation of frames, with a threshold value stored in the abnormal signal information, and determining the input signal as an abnormal signal when the variation value is greater than the threshold value.

7. The network device controlling method of claim 1, wherein the determining comprises comparing a pattern of each frequency band component with an abnormal signal pattern stored in the abnormal signal information, and determining the input signal as an abnormal signal when a difference value between the pattern and the abnormal signal pattern is less than a threshold value stored in the abnormal signal information.

8. The network device controlling method of claim 1, wherein the determining comprises extracting motion information according to variation of frames of the input signal, comparing a standard deviation of the variation with respect to the motion information according to time with a threshold value included in the abnormal signal information, and determining the input signal as an abnormal signal when the standard deviation is greater than the threshold value.

9. A network device comprising:
   an input signal transforming unit for transforming an input signal so as to allow the input signal to be divided according to frequency bands and resolutions;
   an abnormal signal DB (database) for storing abnormal signal information;
   a normal signal determining unit for comparing the transformed input signal with the abnormal signal information stored in the abnormal signal DB, and determining whether the input signal is a normal signal; and
   a signal delivery unit for delivering the transformed input signal to a codec when the input signal is the normal signal.

10. The network device of claim 9, further comprising an abnormal signal processing unit for storing the transformed input signal in the abnormal signal DB when the input signal is not the normal signal, and
   wherein, when the input signal is not the normal signal, the signal delivery unit delivers the transformed input signal to the abnormal signal processing unit.

11. The network device of claim 10, wherein the abnormal signal processing unit comprises:
   a temporary storage unit for storing the transformed input signal; and
   an abnormal signal updating unit for periodically storing data in the abnormal signal DB, wherein the data is stored in the temporary storage unit;
   wherein, when the input signal is not the normal signal, the signal delivery unit delivers the transformed input signal to the temporary storage unit.

12. The network device of claim 9, further comprising an input error indicating unit transmitting a message indicating that the input signal is not the normal signal to another network device when the input signal is not the normal signal.

13. The network device of claim 9, further comprising:
   an input unit for receiving an input signal including video data; and
   an analog-to-digital converting unit for performing analog-to-digital conversion on the input signal that is input to the input unit, and delivering the input signal to the input signal transforming unit.

14. The network device of claim 9, wherein the input signal transforming unit uses a wavelet transform to transform the input signal.

15. The network device of claim 9, wherein the normal signal determining unit compares a variation value, which is of frequency band components of the input signal according to variation of frames, with a threshold value stored in the abnormal signal information, and determines the input signal as an abnormal signal when the variation value is greater than the threshold value.

16. The network device of claim 9, wherein the normal signal determining unit compares a pattern of each frequency band component with an abnormal signal pattern included in the abnormal signal information, and determines the input signal as an abnormal signal when a difference value between the pattern and the abnormal signal pattern is less than a threshold value included in the abnormal signal information.

17. The network device of claim 9, wherein the normal signal determining unit extracts motion information according to variation of frames of the input signal, compares a standard deviation of the variation with respect to the motion information according to time with a threshold value stored in the abnormal signal information, and determines the input signal as an abnormal signal when the standard deviation is greater than the threshold value.

18. A network device controlling method, comprising:
   in response to receiving a request message from another network device, determining message content of the request message; and
   determining whether to receive a data signal according to the message content of the request message, and when the message content of the request message corresponds to an error message indicating that an input signal of the other network device is an abnormal signal, the determining of whether to receive the data signal comprises determining to receive the data signal, and
   the network device controlling method further comprises:
   receiving the data signal transmitted from the other network device;
   comparing the data signal with abnormal signal information stored in an abnormal signal DB, and determining whether the data signal is a normal signal; and
   when the data signal is not the normal signal, transmitting a message indicating that the data signal is not the normal signal to the other network device.

19. A network device controlling method, comprising:
   in response to receiving a request message from another network device, determining message content of the request message; and
   determining whether to receive a data signal according to the message content of the request message, and when the message content of the request message corresponds to a layer determination request message according to a network bandwidth,
   the determining of whether to receive the data signal comprises determining to receive the data signal, and
   the network device controlling method further comprises:
   receiving the data signal transmitted from the other network device;
   calculating an available bandwidth by using the data signal and the layer determination request message, wherein the layer determination request message comprises transmission time information and transmission path information from the other network device;

determining the number of layers by using the available bandwidth, wherein the number of layers is to be comprised in a unit of transmission when the other network device transmits the data signal; and transmitting a message indicating the number of layers to the other network device.

20. A network device controlling method, comprising:

in response to receiving a request message from another network device, determining message content of the request message; and determining whether to receive a data signal according to the message content of the request message, and when the message content of the request message corresponds to a transmission request message requesting to transmit the data signal of the other network device, the determining of whether to receive the data signal comprises determining to receive the data signal, and the network device controlling method further comprises:
receiving the data signal transmitted from the other network device; and
transmitting the data signal to a target network device or a target client that is indicated by the transmission request message.

21. A network device comprising:

a receiving unit for receiving a request message from another network device, and receiving a data signal according to message content of the request message;

a request message determining unit for determining the message content of the request message, and determining whether to allow the receiving unit to receive the data signal according to the message content of the request message;

a data signal delivery unit for delivering the data signal according to the message content of the request message;

a bandwidth determining unit for calculating an available bandwidth by using the data signal and the request message which are delivered by the data signal delivery unit, wherein the request message comprises transmission time information and transmission path information from the other network device;

a layer determining unit for determining the number of layers by using the available bandwidth, wherein the number of layers is to be comprised in a unit of transmission when the other network device transmits the data signal; and a layer indicating unit for transmitting a message indicating the number of layers to the other network device, wherein, when the message content of the request message corresponds to a layer determination request message according to a network bandwidth, the request message determining unit controls the receiving unit to receive the data signal from the other network device, and the data signal delivery unit delivers the data signal to the bandwidth determining unit.

22. The network device of claim 21, further comprising:

an abnormal signal DB for storing abnormal signal information;

a normal signal determining unit for comparing the data signal, which is delivered by the data signal delivery unit, with the abnormal signal information, and determining whether the data signal is a normal signal; and an abnormal signal processing unit for transmitting a message indicating that the data signal is not the abnormal signal to the other network device when the data signal is not the normal signal, wherein, when the message content of the request message corresponds to an error message indicating that an input signal of the other network device is an abnormal signal, the request message determining unit controls the receiving unit to receive the data signal from the other network device, and the data signal delivery unit delivers the data signal to the normal signal determining unit.

23. The network device of claim 21, further comprising:

a data signal storage unit for storing the data signal received from the other network device; and a transmission control unit for transmitting the data signal received from the other network device to a target network device or a target client which is indicated by a request message, and storing the data signal in the data signal storage unit, wherein, when a message content of the request message corresponds to a transmission request message requesting to transmit the data signal of the other network device, the request message determining unit controls the receiving unit to receive the data signal from the other network device, and the data signal delivery unit delivers the request message and the data signal, which is received from the other network device, to the transmission control unit.

24. A network device comprising:

an input signal transforming unit for transforming an input signal so as to allow the input signal to be divided according to frequency bands and resolutions;

an abnormal signal DB for storing abnormal signal information;

a normal signal determining unit for comparing the transformed input signal with the abnormal signal information stored in the abnormal signal DB, and determining whether the input signal is a normal signal;

a signal delivery unit for delivering the transformed input signal to a codec when the input signal is the normal signal;

an abnormal signal processing unit for transmitting a message indicating that the input signal is not the normal signal to another network device when the input signal is not the normal signal;

a receiving unit for receiving a request message from the other network device, and receiving a data signal according to message content of the request message;

a request message determining unit for determining the message content of the request message, and determining whether to allow the receiving unit to receive the data signal according to the message content of the request message;

a data signal delivery unit for delivering the data signal according to the message content of the request message;

a bandwidth determining unit for calculating an available bandwidth by using the data signal and the request message which are delivered by the data signal delivery unit;

a layer determining unit for determining the number of layers by using the available bandwidth, wherein the number of layers is to be comprised in a unit of transmission when the other network device transmits the data signal;

a layer indicating unit for transmitting a message indicating the number of layers to the other network device, a data signal storage unit for storing the data signal received from the other network device; and a transmission control unit for transmitting the data signal received from the other network device to a target network device or a target client which is indicated by a request message, and storing the data signal in the data signal storage unit, wherein the request message determining unit controls the receiving unit to receive the data signal from the other network device when the message content of the request message corresponds to a layer determination request message according to a network bandwidth, when the message content of the request message corresponds to an error message indicating that an input signal of the other network device is an abnormal signal, and when a message content of the request message corresponds to a transmission request message requesting to transmit the data signal of the other network device, and the data signal delivery unit delivers the data signal to the bandwidth determining unit when the message content of the request message corresponds to the layer determination request message according to the network bandwidth; delivers the data signal to the normal signal determining unit when the message content of the request message corresponds to the error message indicating that the input signal of the other network device is an abnormal signal; and delivers the request message and the data signal, which is received from the other network device, to the transmission control unit when the message content of the request message corresponds to the transmission request message requesting to transmit the data signal of the other network device.

\* \* \* \* \*